United States Patent
Lok et al.

(10) Patent No.: US 10,643,487 B2
(45) Date of Patent: *May 5, 2020

(54) COMMUNICATION AND SKILLS TRAINING USING INTERACTIVE VIRTUAL HUMANS

(71) Applicants: University of Florida Research Foundation, Incorporated, Gainesville, FL (US); Augusta University Research Institute, Inc., Augusta, GA (US)

(72) Inventors: Benjamin Chak Lum Lok, Gainesville, FL (US); David Scott Lind, Martinez, GA (US); Juan Carlos Cendan, Gainesville, FL (US); Andrew Brian Raij, Winter Park, FL (US); Brent H. Rossen, Gainesville, FL (US); Aaron Andrew Kotranza, Gainesville, FL (US); Kyle John Johnsen, Athens, GA (US)

(73) Assignees: August University Research Institute, Inc., Augusta, GA (US); University of Florida Research Foundation, Incorporated, Gainesville, FL (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/967,205

(22) Filed: Apr. 30, 2018

(65) Prior Publication Data
US 2018/0322800 A1 Nov. 8, 2018

Related U.S. Application Data

(63) Continuation of application No. 13/148,706, filed as application No. PCT/US2010/023877 on Feb. 11, 2010, now Pat. No. 9,978,288.
(Continued)

(51) Int. Cl.
G09B 7/00 (2006.01)
G09B 23/28 (2006.01)
G06F 19/00 (2018.01)

(52) U.S. Cl.
CPC ............... *G09B 7/00* (2013.01); *G06F 19/00* (2013.01); *G09B 23/28* (2013.01)

(58) Field of Classification Search
CPC ........... G09B 7/00; G09B 23/28; G06F 19/00
See application file for complete search history.

(56) References Cited

U.S. PATENT DOCUMENTS

| 4,375,674 A | 3/1983 | Thornton |
| 5,388,990 A | 2/1995 | Beckman |

(Continued)

FOREIGN PATENT DOCUMENTS

| KR | 2001-0065751 A | 7/2001 |
| WO | WO 2008/109798 A2 | 3/2008 |

OTHER PUBLICATIONS

International Search Report and Written Opinion for International Application No. PCT/US2010/023877 dated Oct. 8, 2010.
(Continued)

*Primary Examiner* — Sahlu Okebato
(74) *Attorney, Agent, or Firm* — Wolf, Greenfield & Sacks, P.C.

(57) ABSTRACT

A system for providing interaction between a virtual human and a user, the system comprising: a tangible interface providing a physical interface between the user and the virtual human, an imaging system directed towards the physical interface to provide images of the user interacting with the tangible interface; a tracking system tracking at least one position or the user; a microphone capturing speech from the user; a simulation system receiving inputs from the tangible interface, the imaging system, the tracking (Continued)

system and the microphone, the simulation system generating output signals corresponding to the virtual human; and a display presenting the output signals to the user.

27 Claims, 8 Drawing Sheets

Related U.S. Application Data (60) Provisional application No. 61/152,300, filed on Feb. 13, 2009.

(56) References Cited

U.S. PATENT DOCUMENTS

| | | | |
|---|---|---|---|
| 5,727,950 | A | 3/1998 | Cook et al. |
| 5,951,301 | A | 9/1999 | Younker |
| 6,149,586 | A | 11/2000 | Elkind |
| 6,493,690 | B2 | 12/2002 | Bertrand et al. |
| 6,611,822 | B1 | 8/2003 | Beams et al. |
| 6,669,483 | B1 | 12/2003 | Leight et al. |
| 7,234,117 | B2 | 6/2007 | Zaner et al. |
| 9,754,512 | B2 | 9/2017 | Kotranza et al. |
| 9,978,288 | B2 | 5/2018 | Lok et al. |
| 2001/0045919 | A1 | 11/2001 | Ishikawa et al. |
| 2002/0127525 | A1 | 9/2002 | Arington et al. |
| 2002/0178002 | A1 | 11/2002 | Boguraev et al. |
| 2004/0064298 | A1 | 4/2004 | Levine |
| 2004/0100466 | A1 | 5/2004 | Deering |
| 2004/0106916 | A1 | 6/2004 | Quaid et al. |
| 2004/0121295 | A1 | 6/2004 | Stuart et al. |
| 2004/0126746 | A1 | 7/2004 | Toly |
| 2004/0138864 | A1 | 7/2004 | Kurzweil et al. |
| 2004/0172259 | A1 | 9/2004 | Yamamoto et al. |
| 2004/0197750 | A1 | 10/2004 | Donaher et al. |
| 2005/0255434 | A1 | 11/2005 | Lok et al. |
| 2006/0166737 | A1 | 7/2006 | Bentley |
| 2006/0229755 | A1 | 10/2006 | Kuiken et al. |
| 2006/0235790 | A1 | 10/2006 | Jung et al. |
| 2007/0003914 | A1 | 1/2007 | Yang |
| 2007/0238085 | A1 | 10/2007 | Colvin et al. |
| 2008/0020361 | A1 | 1/2008 | Kron et al. |
| 2008/0124690 | A1 | 5/2008 | Redlich |
| 2008/0227073 | A1 | 9/2008 | Bardsley et al. |
| 2008/0268418 | A1 | 10/2008 | Tashner et al. |
| 2008/0286735 | A1 | 11/2008 | Cusano |
| 2009/0035740 | A1 | 2/2009 | Reed et al. |
| 2009/0068627 | A1 | 3/2009 | Toly |
| 2009/0208915 | A1 | 8/2009 | Pugh |
| 2010/0295921 | A1 | 11/2010 | Guthrie et al. |
| 2012/0139828 | A1 | 6/2012 | Lok et al. |
| 2012/0225413 | A1 | 9/2012 | Kotranza et al. |

OTHER PUBLICATIONS

International Preliminary Report on Patentability for International Application No. PCT/US2010/023877 dated Aug. 25, 2011.

International Search Report and Written Opinion for International Application No. PCT/US2010/050393 dated Jun. 27, 2011.

International Preliminary Report on Patentability for International Application No. PCT/US2010/050393 dated Apr. 12, 2012.

[No Author Listed], Monarch General Health System: Charting the Future of Nursing Education Today. Old Dominion University Nursing Magazine. 2012:14-17.

[No Author Listed], UF's virtual reality "patient" teaches bedside manners to medical students, Science Daily. Mar. 14, 2004:1-3.

Billinghurst et al., Collaborative Mixed Reality. Human Interface Technology Laboratory. Mixed Reality—Merging Physical World and Virtual World, Proceedings of the International Symposium on Mixed Reality (ISMR '99). Mar. 19-21, 1999, Yokohama, Japan:261-284.

Letterie, How virtual reality may enhance training in obstetrics and gynecology, American Journal of Obstetrics & Gynecology. Sep. 2002;187(3, Part 2): Supplement S37-40.

Pan et al., Virtual reality and mixed reality for virtual learning environments. Computer & Graphics. Feb. 2006;30(1):20-28.

Ward et al., Communication and information technology in medical education, The Lancet. Mar. 10, 2001;357(9258):792-796.

COMMUNICATION AND SKILLS TRAINING USING INTERACTIVE VIRTUAL HUMANS

This Application is a Continuation of U.S. application Ser. No. 13/148,706, filed Nov. 18, 2011, entitled "COMMUNICATION AND SKILLS TRAINING USING INTERACTIVE VIRTUAL HUMANS", which is a national stage filing under 35 U.S.C. 371 of International Patent Application Serial No. PCT/US2010/023877, filed Feb. 11, 2010, entitled "COMMUNICATION AND SKILLS TRAINING USING INTERACTIVE VIRTUAL HUMANS", which is a Non-Prov of Prov (35 USC 119(e)) of U.S. Application Ser. No. 61/152,300, filed Feb. 13, 2009, entitled "COMMUNICATION AND SKILLS TRAINING USING INTERACTIVE VIRTUAL HUMANS". The entire contents of these applications are incorporated herein by reference in their entirety.

STATEMENT REGARDING FEDERALLY SPONSORED RESEARCH OR DEVELOPMENT

The U.S. Government has rights in this invention pursuant to Project Number 0643357 with the National Science Foundation.

BACKGROUND

Exemplary embodiments relate generally to communication skills training, and more particularly, to the use of computer generated, interactive, virtual humans for communication and skills training.

Social interaction training is a major component of business, military, and medical education. In these fields, communication skills are taught using lectures, role-play, and situational immersion with expert-observation. Currently, medical students, for example, can practice interviewing skills with "standardized patients," live actors who are given a script to follow for the interview. However, training the actors can be expensive, and it can be difficult to find sufficiently diverse populations of actors, a factor that can make a subtle difference in the interview process. Current methods of training physical examination include standardized human patients (SPs, actors trained to represent an illness) and physical simulators. SPs are a limited resource and are unable to simulate the symptoms of many illnesses (e.g., a lazy eye, cancer). Additionally it is difficult and costly to recruit SPs for intimate exams such as breast, pelvic, and prostate exams. Physical simulators accurately simulate a wide range of illnesses. However, these simulators lack the social interaction required to train interpersonal skills.

Use of simulators is rapidly expanding to educate end-users in military, law enforcement, cultural competency, and medical domains. In these and other application domains, many scenarios exist in which interpersonal touch plays a crucial role (e.g. medical physical examinations). As current interpersonal simulations lack interpersonal touch, they provide an incomplete simulation of human-human communication and can only be applied to a limited set of interpersonal scenarios.

In addition, medical educators have a critical need for educational tools that expose and provide feedback to students on rarely-experienced patient conditions. Currently, educating students on conditions that are infrequent or require immediate treatment are often "catch as catch can." During their education, students might encounter abnormal physical findings, but curricular planning is difficult given the infrequent or morbid nature of the problem. Missing these experiences negatively impacts medical student education, diagnosis skills, and resulting patient care.

In addition, current simulators lack the ability to complete an After-Action Review (AAR). In AARs, students review their social interaction, and are evaluated using a combination of self, instructor, and peer-group evaluation. The evaluation serves as feedback to effectively improve social interaction skills.

What is needed is an interactive virtual human experience that allows for a wide range of experience, at a low cost, that creates repeatable training experiences without loss of AAR.

SUMMARY

An exemplary embodiment is a system for providing interaction between a virtual human and a user, the system comprising: a tangible interface providing a physical interface between the user and the virtual human, an imaging system directed towards the physical interface to provide images of the user interacting with the tangible interface; a tracking system tracking at least one position or the user; a microphone capturing speech from the user; a simulation system receiving inputs from the tangible interface, the imaging system, the tracking system and the microphone, the simulation system generating output signals corresponding to the virtual human; and a display presenting the output signals to the user.

BRIEF DESCRIPTION OF THE DRAWINGS

Referring now to the drawings.

DETAILED DESCRIPTION

Embodiments of the invention use mixed reality humans (MRH) as a tangible interface and image processing techniques to afford touch-driven communication between a person and a virtual person. The tangible interface represents a portion of the virtual person's body and is registered to the virtual person's visual representation. The tangible interface provides passive haptic feedback and actively detects a user's touch. A simulation allows the MRH to respond with appropriate speech and gestures interprets the user's touch. Image processing techniques are used to track passive physical objects, such as the MRH's clothes, and to incorporate a visually faithful avatar of the user into the virtual world. Image processing techniques and the tangible interface allow the user's touch to drive communication with the MRH.

Figure 1:
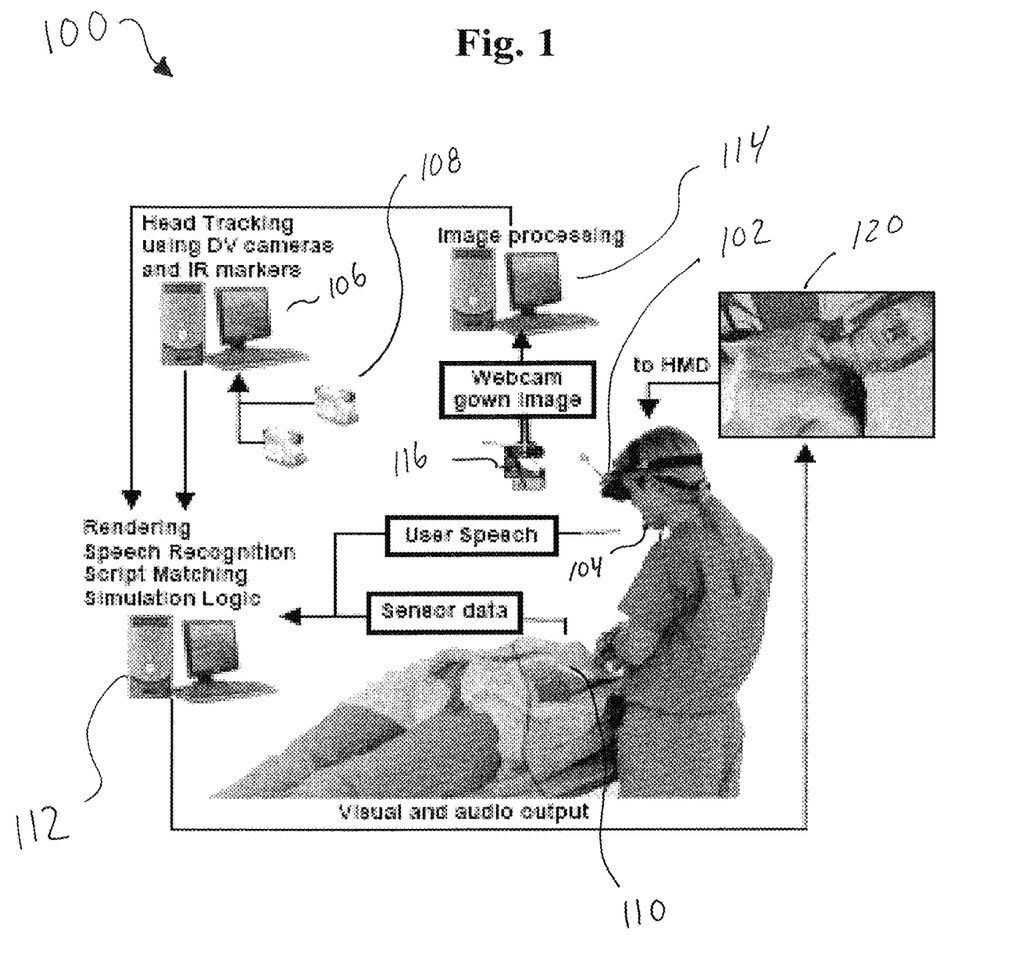
FIG. 1 depicts a system for Mixed Reality Human (MRH) interactions.

The layout of a MRH system 100 is shown in FIG. 1. The user wears a head-mounted display (HMD) 102 presenting images through a display screen and sound through a speaker. The user is also fitted with a microphone 104. In exemplary embodiments, the HMD 102 is an eMagin z800 with 800×600 resolution and 40-degree diagonal field of view. This HMD 102 was chosen for its light weight (<8 oz.), small form-factor, and unobtrusiveness relative to most high resolution HMDs. Alternate displays may include a data projector or a large screen television. A head tracking system 106 includes cameras 108. The pose of a user's head (e.g., 6 degrees of freedom) is tracked using infrared-markers on the HMD 102. Other parts of the user's body (e.g., hands) could be tracked using additional IR markers on the user. IR cameras 108 detect the location of the infrared markers and head tracking system 106 determines the pose of the user's head. The head tracking system 106 may be implemented using a computer programmed to perform the processes described herein.

The MRH is implemented using a tangible interface 110 fitted with force sensors to detect the user's touch on the tangible interface 110. The sensor data and the user's speech captured by the microphone are provided to a simulation system 112. Also, an imaging system 114 includes a camera 116 to provide images of the tangible interface 110 and the user's interaction with the tangible interface 110. The imaging system 114 may be implemented using a computer programmed to perform the processes described herein.

The simulation system 112 receives the images from the imaging system 104, the head tracking data from head tracking system 106, the sensor data from the tangible interface 110 and the user speech. The simulation system 112 analyzes this information to provide the appropriate visual and audio output signals to the HMD 102. A virtual representation of the patient is shown at 120. This allows the user to evaluate the user's expressions, tone of voice, etc., all while still physically interacting with the tangible interface 110. Simulation system 112 may be implemented using a computer programmed to perform the processes described herein. Further, the imaging system 114, tracking system 106 and simulation system 112 may be implemented with one computer, or any number of computers, and need not be separate processing devices.

Users are able to interact with the MRH through a combination of verbal, gestural, and haptic communication techniques. The user communicates verbally with the MRH patient using natural speech. Wireless microphone 104 transmits the user's speech to the simulation system 112, which performs speech recognition. Recognized speech is matched to a database of question-answer pairs using a keyword based approach. The database for a scenario consists of 100-300 question responses paired with 1000-3000 questions. The many syntactical ways of expressing a question are handled by the keyword-based approach and a list of common synonyms. The MRH responds to matched user speech with speech pre-recorded by a human patient through the HMD 102.

The MRH has gaze behavior including looking at the user through the HMD when the user is talking. The user's head gaze is also computed by head tracking system 106. To communicate with the user, the MRH changes facial expressions and has a set of keyframe based animations for gestures that are specific to the scenario (e.g., the breast exam patient points to a painful part of her breast).

The tangible interface 110 of the MRH provides passive haptic feedback and allows the user's touch to be an input to drive the communication. A feedback loop allows the user's touch to drive communication with the MRH. The feedback loop proceeds as: (1) the user's touch is detected by force sensors in tangible interface 110; (2) outputs of the force sensors are processed by a microcontroller and sent to the simulation system 112 over a serial link; (3) the simulation system 112 matches the current set of sensor values to a database of touch-gestures (e.g., light palpation of left breast, resting hand on shoulder); (4) the simulation system instructs the rendering module to cause the MRH to respond to the touch using speech and gestures. In this way the user's touch drives the communication and the flow of the interaction. For example, the MRH patient reported that she had pain in her left breast only after the user palpated her breast, eliciting verbal and gestural expressions of pain. In this case, the user's touch steered the conversation to the topic of the patient's breast pain.

In an exemplary embodiment of the current invention, an MRH patient breast examination training session is described. Building towards the goal of incorporating MRH patients into a medical education curriculum for training clinical exam skills, two user studies provide an initial evaluation of (1) medical students' behavior when interacting with the MRH breast exam patient and (2) the usability and acceptability of using MRH patients for practice and evaluation of students' communication and physical exam skills.

On exemplary use of the MRH is to simulate a breast exam. The tangible interface of the MRH breast exam patient is an instrumented mannequin incorporating a physical breast simulator 110 in place of the mannequin's left breast. The physical breast simulator 110 incorporates 48 force sensors to detect palpation of the breast. In alternate embodiments, an additional 16 force sensors are added to the mannequin's abdomen, upper arm, left armpit, and clavicle in order to support palpation ancillary to the breast exam and to detect additional interpersonal touches such as a comforting touch on the shoulder. While the invention has been described with reference to a specific number of sensors, it will be understood by those skilled in the art that a varying number of sensors may be used to achieve the same result.

The MRH patient wears a virtual hospital gown, the physical correlate of which is worn by the mannequin. The opening and closing of the gown is tracked by a camera 116, using computer vision techniques (e.g., infrared fiducial tracking), causing the MRH's virtual gown to open and close on HMD 102. The gown is important to teach the process of a breast exam; to maximize patient comfort, only one side of the gown should be opened at a time during the examination. By tracking the gown, the opening and closing of the gown become input to the interaction. By enabling touch-driven communication, interpersonal simulation can be applied to a wide range of scenarios in which touch is a critical component, and can more completely simulate human-human communication.

To afford touch-driven communication between human and virtual person, mixed reality humans merge virtual and real spaces: the virtual person's visual representation is co-located with the tangible interface 110 that represents a portion of the virtual person's body. Users touch the tangible interface 110 while viewing the virtual person through a display device such as an HMD 102.

The virtual person is a full-body virtual character with facial animation and gestural capabilities including lip synched speech, eye blinking, breathing, pointing, idle behaviors (e.g., looking around), the ability to maintain eye contact with the user, as well as scenario specific animations. The MRH breast exam patient is able to point to locations in her left breast where she has found a mass and where she is experiencing pain. The MRH patient has animations to transition between four positions used in a breast exam: sitting with arms relaxed, sitting with hands pressed on hips and chest pushed out, sitting with arms raised above head, and lying down with arms raised above her head.

To improve the visual realism of the MRH patient, video of the tangible interface's physical breast and the user's hands are incorporated into the virtual scene displayed on the HMD 102. This is accomplished by simulation system 112 through color segmentation of the video stream of a camera 116 overlooking the tangible interface. The tangible interface 110 is colored black except for the breast, allowing the breast and the user's hands to be extracted from the video stream with little noise. This is accomplished by performing a Gaussian blur to remove noise, and color segmentation to separate the foreground from the black background. The resulting video stream is projected onto a mesh (created by scanning the tangible interface 110 with a laser scanner) using a projected texture. The alignment of the projected texture and mesh may be performed manually. Alternatively, automatic alignment may be achieved by tracking system 106 tracking the location of camera 116 and the tangible interface 110. These features allow a more complete clinical breast exam to be performed and increase the visual and behavioral fidelity of the MRH, allowing users to see their hands during palpation and the virtual breast tissue to behave realistically by deforming to the user's palpation.

Virtual Human (VH) experiences are currently limited by the ability to achieve robust conversational interaction without extensive in-system testing. An exemplary embodiment includes a Virtual People Factory, which employs a user-driven distributed modeling approach to conversational modeling for a healthcare training application. By providing incentive to users in the form of educational value, the approach rapidly develops a conversational model. As users complete tasks, they provide new typed inputs, as well as new virtual human responses. A conversational domain expert manages the dataset of inputs and responses (e.g., an educator).

Anticipating the utterances that the user will say to a VH through student interactions, and generating the responses of the VH through educator feedback, are the two elements used in order to accurately model human-VH conversations. Accurate modeling is important to expand the application of VH experiences to the training of communications skills. An asynchronous acquisition of knowledge for modeling human-VH conversations includes educators receiving new utterances from students and as a result, creating new responses. In turn, students speak to the VH (utterances) and receive responses from the VH.

The creation of VHs for practicing interview skills is logistically difficult and time consuming. The logistical hurdles involve the efficient acquisition of knowledge for the conversational model; specifically, the portion of the model that enables a VH to respond to user speech. Acquiring this knowledge has been a problem because it required extensive VH developer time to program the conversational model. Embodiments of the invention include a method for implementing a Virtual People Factory.

Virtual People Factory (VPF) is a system that leverages end-user content creation to address the issues of robust and efficient conversational modeling. VHs are being developed to play the role of virtual patients (VPs) to train health profession students on procedural, diagnosis, and communication skills. In surveying the existing systems, healthcare students interact by typing, choosing from a predefined list, or speaking their utterance to the VP (e.g., how long have you had the pain?). The VP is represented as either recorded video of actors or a 3D computer graphics model of a VH. The VP is presented on a monitor, or at life-size with a projector, large screen TV, or head-mounted display.

Figure 2:
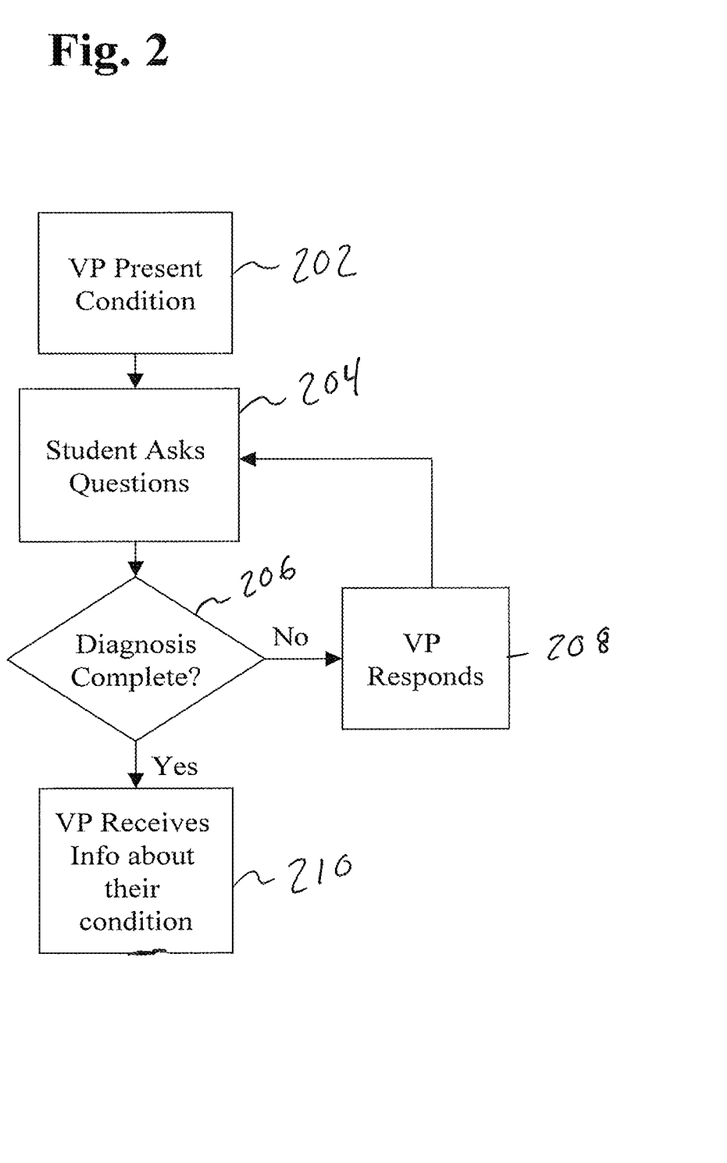
FIG. 2 is a flowchart of an exemplary embodiment of a student-Virtual Person interaction.

FIG. 2 illustrates a typical interaction between a student and a VP. At 202, the VP presents a condition (e.g. pain, cancer, or depression), and the goal of the student is to 1) diagnose the VP's condition, 2) prescribe a treatment plan, and 3) develop a rapport with the VP through empathy, professionalism, and proper procedure. The VP's goal is to 1) receive information about their condition and 2) be comforted by the doctor.

At 204, the student interviews the VP in a 15-minute conversation, and asks questions about the current condition and past medical history. The VP replies with appropriate responses and/or questions at 208 until the diagnosis is determined complete at 206. Once the diagnosis is complete, the student provides the VP information about their condition at 210.

In this conversation, the student's goal is to develop skills by practicing which questions to ask, how to ask the questions, and how to empathize with the VP. The success of VPs has led to interest in integrating VHs into medical curriculums. The barrier to integrating VPs into medical school curriculums is that many (tens to hundreds) of these virtual patient scenarios are required, and the creation of these scenarios is tedious and inefficient. The creation of educational VH experiences involves modeling not a doctor-patient interview, but a novice doctor-patient interview. Thus, students would say many utterances to the VP that were unanticipated. To alleviate the time consuming portions of this approach of reprogramming, embodiments will leverage 1) online distributed interfaces to speed collaboration 2) many novice health students to enumerate the space of questions novices ask, and 3) a few healthcare educators to enumerate the VH response space.

With VPF, healthcare educators construct a conversational model themselves. First, they develop the initial script, similar to the existing approach. Second, educators recruit their students to practice interview skills with an online VH, to enumerate the space of what novice healthcare students will type or say. Third, educators integrate appropriate VH responses. This method enables end-users to play a critical role in the rapid development of robust human-VH experiences. Generating spoken VH conversations once took at least 6 months to create a conversational model with 75% accuracy. With VPF, a conversational model with 80% accuracy can be generated in two weeks.

VPF fulfills the following three goals: 1. Enable end-users to model VH conversations, 2. make the modeling process benefit the end-users (both student and educator), and 3. overcome the scale problem in knowledge acquisition for H-VH conversations. Consider the example of the healthcare scenario. The students provide the questions they will ask. The educator will provide what the VH will say in response to student questions.

Figure 3:
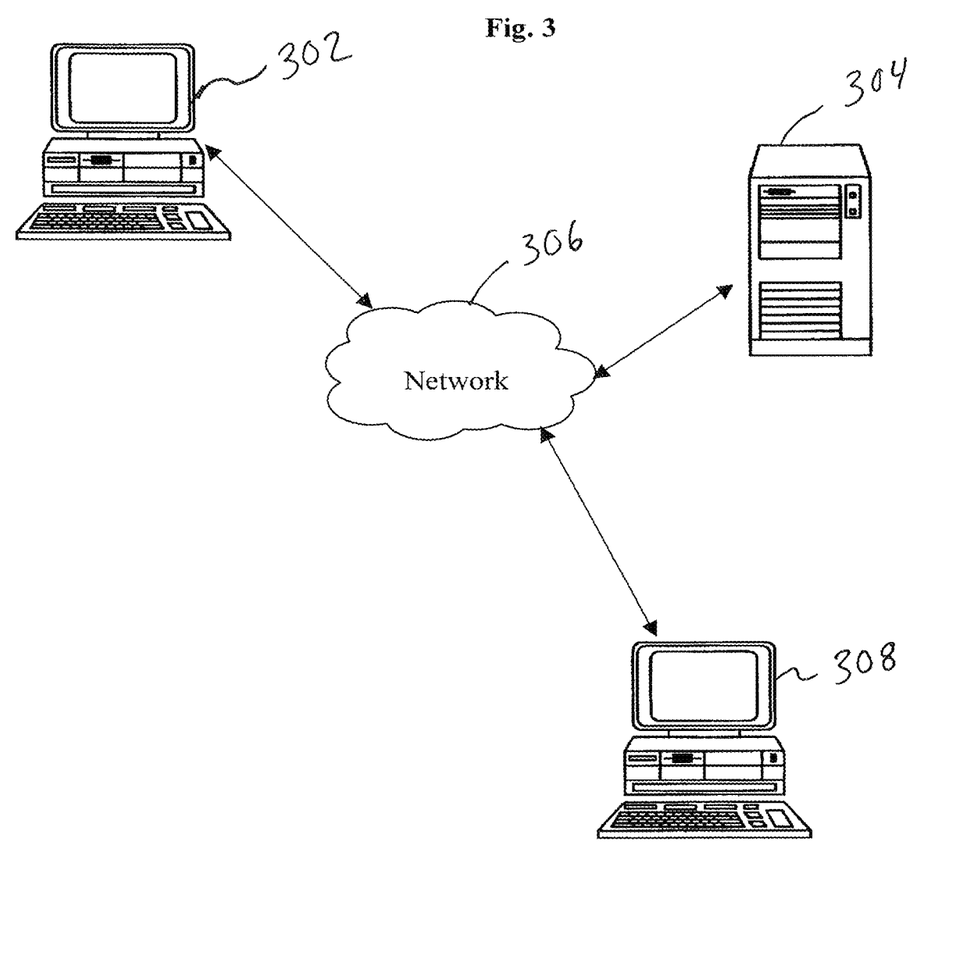
FIG. 3 depicts a system for implementing a Virtual People Factory.

The VPF may be executed in a client-server architecture such as that shown in FIG. 3. An educator system 302 communicates with a virtual people factory system 304 over a network 306. The educator system 302 may be a computer programmed to execute the operations described herein. The VPF system 304 may be a computer or server programmed to execute the operations described herein. The VPF system 304 interacts with students at user system 308 as described herein to facilitate creation of virtual people.

Figure 4:
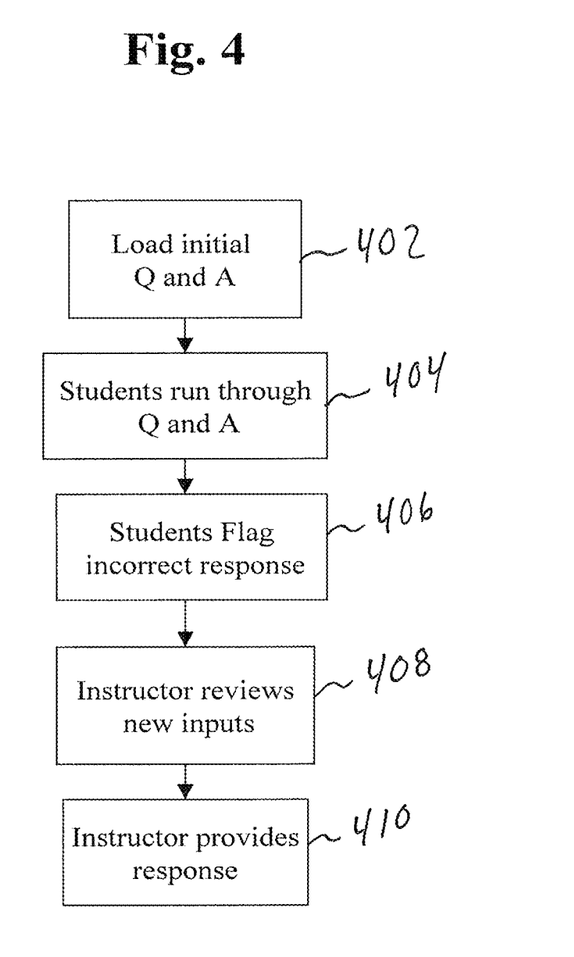
FIG. 4 is a flowchart of a process for updating responses in the Virtual People Factory.

As seen in FIG. 4, the educator first creates an initial script at 402. During this task, the educator comes up with a scenario concept. In one example, the concept is dyspepsia, that is, discomfort centered in the upper abdomen. The educator uses educator system 302 to access the VPF system 304 and create the initial script. With this concept in mind, the educator then asks the VH all the questions they can think of, and answers those questions themselves. This creates an initial conversational model at 402 to use for student interactions. The healthcare educator then enlists their students to practice interviewing this new VP.

Figure 5:
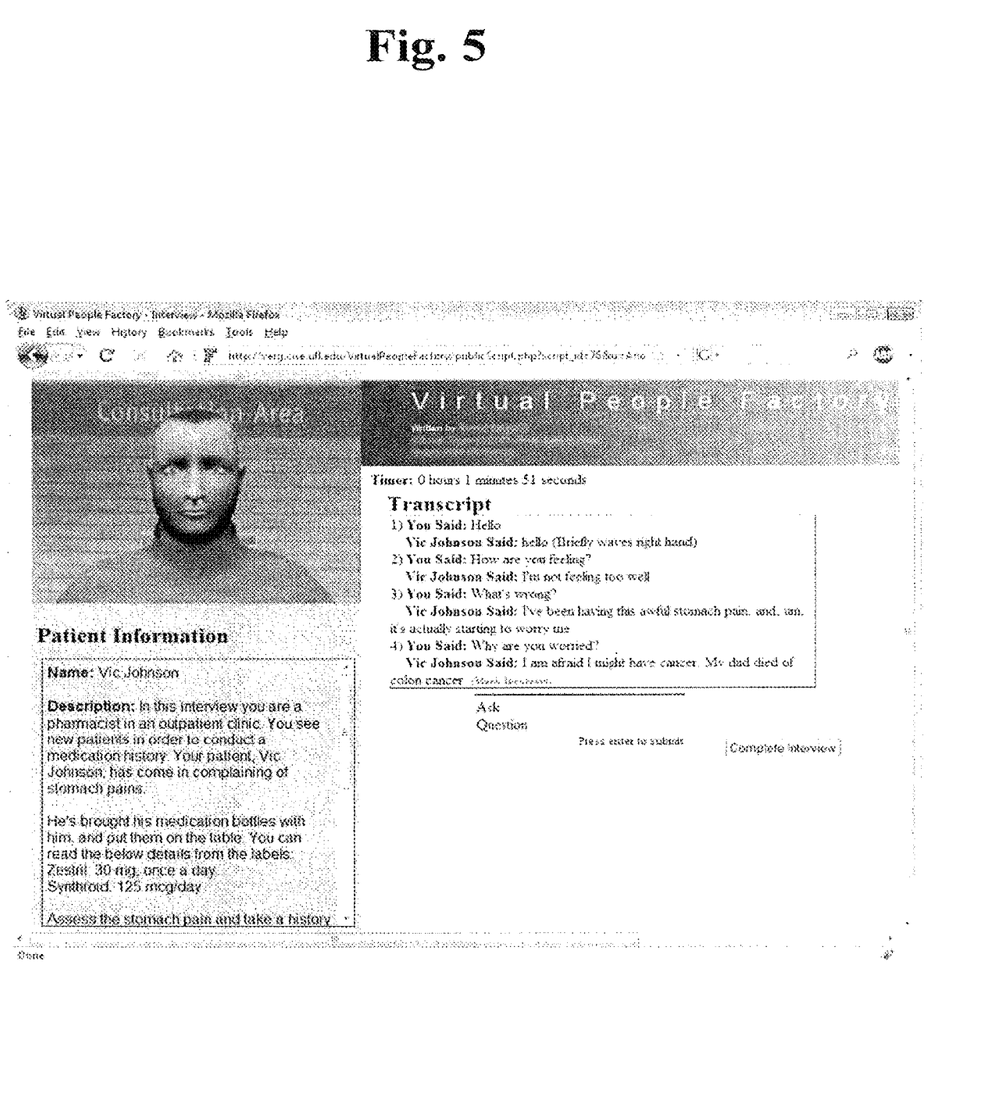
FIG. 5 depicts an exemplary implementation of the Virtual People Factory interface.

Novice healthcare students can now practice their interview skills through an online typed interaction at 404. This interaction resembles an Instant Messaging application. Since these applications are relatively simple, and familiar to most users, little to no training is required. This interface is seen in FIG. 5. The student uses this application to have a conversation with the VP. These conversations are intended to last 10-15 minutes. The student's goal is to assess the patient's medical history and provide empathy for the patient's medical troubles. The character in FIG. 5 is not animated. Exemplary embodiments will use an inanimate character in order to focus the task solely on speech interaction. The students need to not be distracted by an embodiment of the VH or to read gestural cues that were not present. Users are required to focus on achieving their goals through speech interaction, thus gaining more data for knowledge acquisition from each interview. During these interviews, the system automatically gathers new inputs. However, it cannot reliably identify which inputs it responded to incorrectly. The instructions ask users to press a mark incorrect button when the VP responds incorrectly at 406. This helps to catch the majority of errors automatically. The errors of this type that are not automatically caught can be identified by examining the transcripts of interactions. Within the transcripts, the VPF system 304 flags responses having a low confidence in answering. This way the educator can review only the responses that were likely to be incorrect. After student interactions, the healthcare educator reviews the responses that were incorrect, as well as new inputs at 408. This process is asynchronous and may occur days or weeks after the student interactions.

The healthcare educator responds to new inputs one at a time. They either choose a response that VPF has deemed likely to be appropriate, or they type a new response. If a new response is typed, VPF provides a list of similar responses to the new response. The educator then chooses from an existing response, or submits their new response at 410. This process allows the educator to control the information students will receive, as well as the personality of the VH. This is also where educators validate the students' input. Students sometimes submit utterances with typos, or sentences that do not make sense. The educator can correct those utterances at this step. When the educator has reviewed each of the new utterances and incorrect responses, the round of user testing is complete. Each round of user testing provides a diminishing number of new inputs. If many new inputs are gathered from a round of user testing, they should be corrected, and the round should be repeated with new users. Once a round of testing is encountered where few new inputs are gathered, the VH was able to respond to most of the student utterances correctly.

VPF's conversational modeling process is a learning system. In exemplary embodiments, it is a form of case-based reasoning. Case-based reasoning's (CBR's) defining element is the reused information from specific previous experiences to come up with a response for the current stimulus. It is a learning system in which successes and failures are identified in order to solve similar problems in the future. In the circumstances of conversational modeling, the stimuli are user utterances, and responses are VH speech. The successes and failures are identified during the interactions of healthcare students. The student marks a response incorrect to identify a failure. The healthcare educator then enters a correct response so that the system can have success in the future. This system depends on retrieval of correct responses based on past experiences. VPF uses a combination of exact matches and keyword weighting to find previous stimuli that match the current stimuli. For the purposes of clarity, previous stimuli will be referred to as triggers; while the current input stimulus (user utterance) will be referred as the stimulus. The following steps are taken to find the trigger that matches a stimulus: VPF first conditions the stimulus to deal with typos, speech recognition errors, and to standardize the input. The conditioning starts with replacing the contractions such as "we're" into "we are." VPF then replaces words in the stimulus that are similar to script keywords, but are not keywords. Keywords are a list of words that are not common to all conversations, but are found in the current corpus of trigger data. The VPF system 304 automatically extracts the list of keywords from the corpus of triggers.

The keyword list is used to check the stimulus for words that are similar to (but are not) keywords. Three techniques are used to find words that are similar to keywords: spell check, levenstein distance, and double metaphones. Levenstein distance checks how many letters are different in one word versus another, and double metaphones identify words that sound like each other. Together these techniques convert phrases, for example, "Is aspring casing the pin?" into "Is aspirin causing the pain?" The VPF then finds the most relevant trigger that matches this stimulus. The search starts with testing for exact match to a trigger in the corpus. This step checks if the stimulus matches any of the triggers exactly. The purpose is to return exact matches as quickly as possible.

If no exact match exists, the next step is to use a fulltext search of the triggers. This step may use, for example, MySQL fulltext search to find triggers that are at least vaguely similar to the stimulus. Fulltext searching is very fast. However, it is designed for searching websites, not a corpus of triggers. It therefore returns as many relevant results as possible. Using only fulltext searching would result in many false positives. False positives are when the VH responds when it does not have a relevant previous experience. False positives occur when a stimulus shares words with a trigger, but has a different semantic meaning. For example, "What medications are you taking?" may match to "You should not be taking those medications." Many of the words are the same, but the words should not change the meaning. Using fulltext search, most stimuli will match many different triggers. The fulltext search step is primarily used to cull the corpus of data to the triggers that possibly match the stimulus. The culled list of triggers is then reordered using a keyword relevance-weighting scheme. Each trigger is assigned relevance based on how many keywords the trigger contains that the stimulus also contains. Each trigger loses relevance for each keyword it contains that the stimulus does not contain. This method is better suited to conversations than the method used by fulltext searching. The relevancies are updated with resistance to topic changes. This step adds a slight relevance bonus to triggers that are within the same topic as the previous response. All triggers below a certain minimum relevance are cut off. At this point, high relevancies are likely to be accurate, while low relevancies are likely to be false positives. Last, VPF outputs the response that is linked to the trigger with the highest relevance.

Another exemplary embodiment of the current invention is an after-action review (AAR) with Human-Virtual human (H-VH) experiences. H-VH experiences are seeing increased use in training for real-world, H-H experiences. To improve training, the users of H-VH experiences need to review, evaluate, and get feedback on them. AAR enables users to review their HVH interactions, evaluate their actions, and receive feedback on how to improve future real-world, H-H experiences. The Interpersonal Scenario Visualizer (IPSViz), an AAR tool for H-VH experiences, is also presented. IPSViz allows medical students to review their interactions with VH patients. The IPSViz may be implemented on a computer executing a computer program to perform the processes described herein. In exemplary embodiments, the IPSViz is implemented by simulation system 112. To enable review, IPSViz generates spatial, temporal, and social visualizations of H-VH interactions. Visualizations are generated by treating the interaction as a set of signals. Interaction signals are captured, logged, and processed to generate visualizations for review, evaluation and feedback. The results of a user study show that reviewing the visualizations helps students become more self-aware of their actions with a virtual human and gain insight into how to improve interactions with real humans.

To improve skills education, H-VH interactions with AAR are augmented. AAR enables students to review their H-VH interaction to evaluate their actions, and receive feedback on how to improve future real-world experiences. AAR for H-VH interactions incorporates three design principles: 1. An H-VH interaction is composed of social, temporal, and spatial characteristics. These characteristics will be explored by students via AAR visualizations. 2. An H-VH interaction is a set of signals. Interaction signals are captured, logged, and processed to produce visualizations. 3. An H-VH interaction is complex. Students gain insight into this complexity by reviewing multiple visualizations, such as audio, video, text, and graphs to enable AAR, IPSViz processes the signals characterizing an HVH interaction to provide an array of visualizations. The visualizations are used to facilitate interpersonal skills education. Novel visualizations can be produced by leveraging the many signals that are captured in an H-VH interaction. Given an H-VH interaction, AAR is facilitated through the following visualization types: the H-VH interaction can be 3D rendered from any perspective, including that of the conversation partner (the virtual camera is located at the VH's eyes). These are called "spatial visualizations." Students are able to perceive "what it was like to talk to themselves"; events in the H-VH interaction are visualized with respect to an interaction timeline. These are called "temporal visualizations." Students are able to discern the relationship between conversation events; Verbal and nonverbal behaviors are presented in log, graph, and 3D formats. These are called "social visualizations." Students are able to understand how their behavior affects the conversation.

Figure 6:
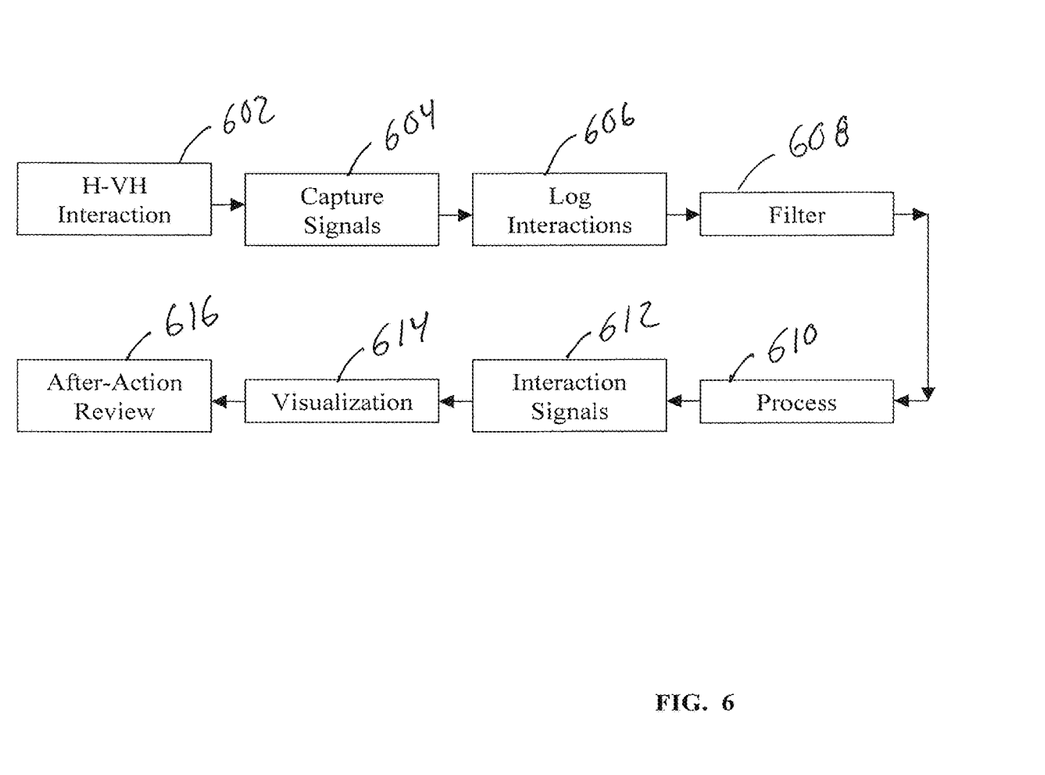
FIG. 6 depicts a process flow for the After Action Review process.

Turning now to FIG. 6, a H-VH interaction may be implemented in accordance with exemplary embodiments will now be described. IPSViz is based on representing a H-VH interaction as a set of signals. The signals include user speech, video, tracking data, and VH behavior. IPSViz processes and visualizes these interaction signals to enable AAR. The IPSViz may be implemented on a computer system programmed to perform the processes described herein.

As shown in FIG. 6, an H-VH interaction occurs at 602. This interaction may occur in an environment such as that shown in FIG. 1. During the interview, the VH will also ask the student questions to learn what is happening to her and why. The VH may also ask questions in the hope that the student can relieve her anxiety about the medical problem. Typical questions a VH can ask include "Do you know what I have?" and "Do you think this could be cancer?" Students should answer these questions carefully to relieve the VH's anxiety and build rapport with the VH.

To generate visualizations of an interaction, the interaction is captured from a variety of sensors at 604. The sensor data collected at 604 may be from any number of sources including user speech, image data from imaging system 114, tracking data from tracking system 106, script data from simulation system 112, etc. From a signal analysis perspective, capture is equivalent to sampling the interaction as if it were a set of continuous signals. These interaction signals captured at 604 characterize the interaction between a human and virtual human.

As communication is mediated by the system's input and output devices, system inputs and outputs are logged at 606 to capture H-VH communication. Natural speech students wear a wireless microphone. This enables talking to the VH using natural speech. Speech recognition software extracts the words spoken by the user from microphone input. Both the speech waveform and the speech recognition output are logged. Students wear a hat and glove outfitted with reflective markers. Also, markers are attached to the back of the student's chair. Combining head and chair tracking data enables computing approximate body lean. The markers are tracked by an optical, infrared tracking system 106. This allows the system to detect user presence, head gaze, pointing gestures, and chair motion. Detected events and the 3D positions of each marker are logged. Video of the interaction is also recorded for later review in IPSViz. Video is recorded because it is a standard practice for students and instructors to review videos of patient interactions.

When a student speaks to the VH, the speech recognition software interprets her words. A keyword matching algorithm matches speech recognition output to questions in the VH's response database. If a match is found in the database, the VH executes a corresponding vocal and gesture response. The VH's gesture and speech responses are logged. The interactions take place in a medical exam room or a mock exam room in a controlled laboratory. A projection display or a head-mounted display is used to show the user the virtual environment (VE). The VE is rendered at life-size, such that virtual objects appear to have the same proportions as they would if they were real. The VE is rendered in real-time using, for example, the OGRE 3D rendering engine. Using the head-tracking inputs, the system renders the VE from the student's perspective. This allows the system to playback the conversation from the student's perspective. The head tracking data also allows the VH to respond when the student enters the room. In the HMD condition, head-tracking enables looking around the virtual room. Life-size, user-perspective rendering and VH responsive behaviors create a highly immersive experience. 3D environment parameters, rendering parameters, and VH gaze are logged.

Data Capturing of a ten-minute H-VH interaction produces on average 70 megabytes of data, stored into a number of separate files. A time-stamped list of events is generated including the speech and gestures of the VH and student. As user speech and gestures are interpreted by imperfect speech and gesture recognition, this data can contain errors; binary file that describes the state of the student over the course of the interaction. This is primarily tracking data. The VH state is similar to the student state log. It describes the state of the VH over the course of the interaction. VH state includes head pose and a variable indicating if the VH is talking. A wireless microphone worn by the student records audio recording of the student's speech. Note that audio of the interaction is also recorded to the video log. Video is recorded of the VH and the user. System and rendering parameters are also captured. Note that this list of data is not meant to be exhaustive, nor completely representative for all VH applications. Rather, the types of data captured were chosen because of the importance of: verbal and nonverbal behavior in communication; communication content and rapport-building in the medical interview; and communication content and rapport-building in H-VH experiences.

Before generating visualizations, interaction signals may undergo filtering at 608 and processing at 610. In both stages, a chain of digital filters is applied to one or more signals to derive new signals. Filtering and processing are separated into two stages as each solves a different problem. Filtering compensates for errors caused by sampling a continuous signal with real-world sensors (e.g. discretization error and noise). Processing manipulates and combines signals to provide interaction signals at 612.

The captured interaction data is interpreted as a set of signals that can be filtered and processed. Filtering and processing is necessary to 1) compensate for sensor error, 2) combine signals to form new signals, and 3) extract signals embedded in other signals. Sensor Error Real-world sensors introduce errors into the signals they sample. Errors include noise, discretization error, information loss, and aliasing. For example, in optical trackers, these errors correspond to jitter from CCD noise and discrete pixels, data loss due to occlusion and limited tracking volumes, and aliasing when motion is faster than the Nyquist rate. Filtering cannot correct for these errors, but it does compensate for them to acceptable tolerances. Filtering prevents sensor errors from propagating into the visualizations that are presented to users.

After filtering and processing, interaction signals are mapped to the visual (or other perceptual) domain to produce visualizations at 614. The visualizations allow users to gain new insight into H-VH communication through an after action review process at 616. The discussion of IPSViz is guided by a real-world H-VH experience including the interaction between a health professions (HP) student and a VH. This experience was chosen to guide the discussion because HP students 1) take this H-VH interaction seriously, and 2) need review, evaluation, and feedback to improve their communication with patients. A typical interaction between a HP student and a VH begins with the VH complaining of a medical problem (e.g., pain). The student's goal is to determine what the problem is (diagnosis) and treat it. Effective diagnosis and treatment requires gathering accurate information from the VH. The student gathers information from the VH by asking the VH questions and examining the VH.

An exemplary embodiment measures forward body lean by measuring the angle between the student's back and an up-vector (a vector perpendicular to the floor of the room). An approximate body lean signal L(t) is computed by combining head and chair tracking data. First, head and chair data is filtered to compensate for tracker jitter. Then the chair position is subtracted from the head position to compute a head-chair vector. The head-chair vector serves as a proxy for a body lean vector that runs along the student's spine. L(t) is set to the angle between the head-chair vector and the up-vector. L(t) is a reasonable approximation of body lean because it increases when leaning forward and decreases when leaning back. This allows identification of 1) when body lean changes and 2) the direction of the change (forward or backward).

A topic signal is an example of an embedded signal. Topic signals characterize the discussion of a topic in an H-VH interaction. As the transcript log contains all the speech content of the interview, topic signals are embedded in the transcript. Topic signals can be computed by filtering the transcript log. Filtering extracts words from the transcript that are associated with a topic of interest. For example, if the topic is "family history" then words like "family", "sister", and "mother" remain after filtering. Let F(t) be a mathematical representation of the topic signal. Then for all interaction times associated with the remaining words, the topic signal F(t)=1, else F(t)=0.

IPSViz generates visualizations to help health profession students evaluate interactions with VHs. Students evaluate themselves by asking certain kinds of questions about the interaction: How much time did I spend discussing the VH's symptoms? Where was the VH's pain? When was I empathetic to the VH? Was there a moment when my nonverbal behavior affected rapport with the VH negatively? Did I look at the VH when she was talking, or elsewhere? The spatial questions focus on where objects are and how they are related to each other in the space of the 3D world. The temporal questions focus on when events happen and how long they happen for. Furthermore, these questions focus on how the student behaved socially with the virtual human. IPSViz generates visualizations that are spatial, temporal, and social to help students gain insight into their communication with the VH.

Figure 7:
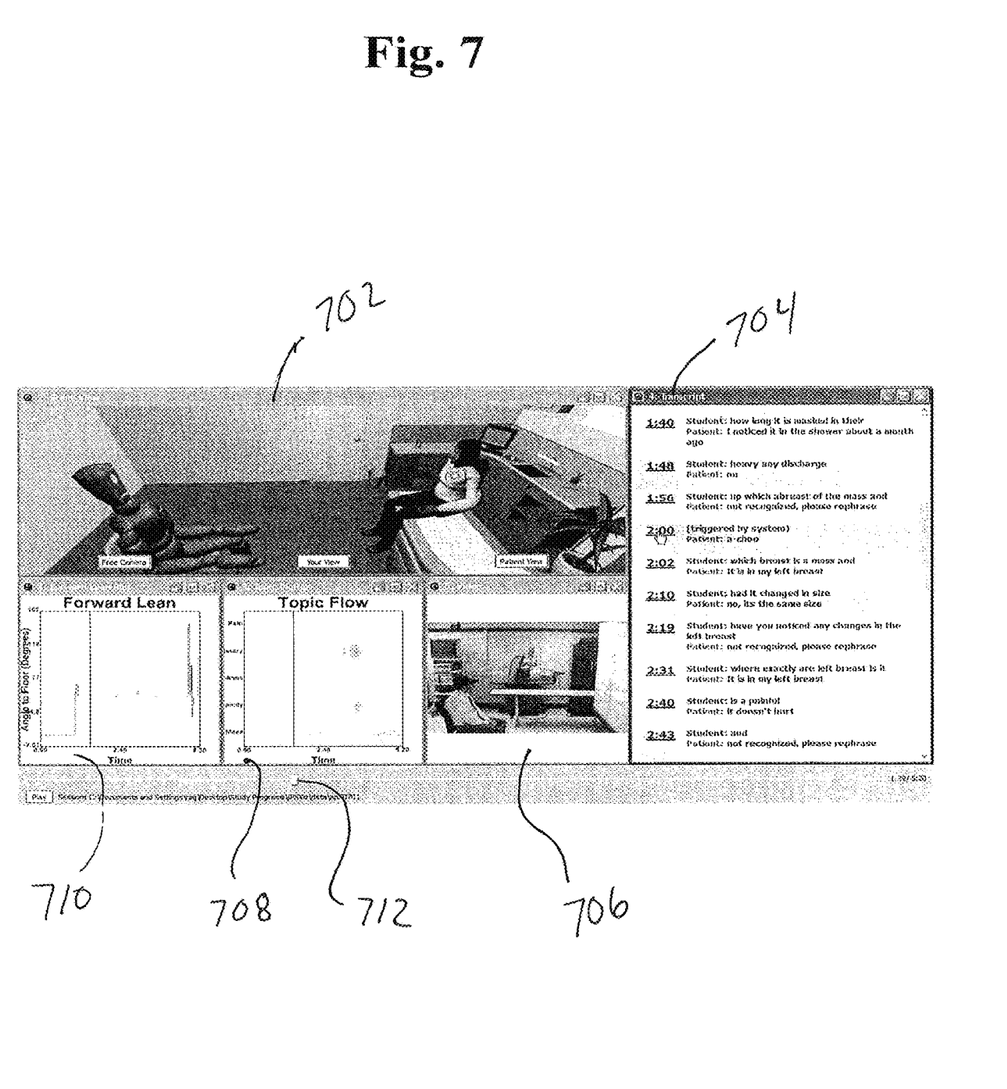
FIG. 7 depicts a user interface for use in the After Action Review process.

FIG. 7 depicts an exemplary representation of a visualization screen generated by the IPSViz. The visualization screen may be generated by the simulation system 112 that collects all information from the H-VH interaction. The visualization screen includes a number of windows, which allow the user to review a variety of different types of information. A virtual immersion screen 702 depicts the H-VH interaction in a virtual environment, such as a virtual examination room. The entire interaction between the user and VH can be viewed. A transcript screen 704 presents a text transcript of the interaction including a timeline of when certain interactions occurred between the user and the VH. This allows the user to view their own body language corresponding to certain interactions A raw video screen 706 presents video of the user, in the physical world, interacting with the VH. Graphs 708 and 710 show plots of various factors and may be customized to show a variety of elements. In the example of FIG. 7, graph 708 is a topic flow diagram depicting topics discussed between the user and the VH with respect to time. Graph 710 is a plot of the user's forward lean with respect to time. Again, this allows the user to correlate their physical posture (e.g., forward lean) with respect to certain points in time, also correlated to certain topics in graph 708.

IPSViz renders the space of the H-VH interaction using 3D models or live video of the student, VH, and the mixed interaction environment (real room+virtual medical exam room). Using tracking data, the poses of the VH, user, and chair models are updated to reflect their motion during the interaction. This allows students to review their behavior in the space of the interaction environment. Using a 3D representation of the interaction enables rendering the interaction from multiple viewpoints. This allows students to see what their behavior looked like to an external observer or to the VH. Seeing the interaction through the VH's eyes is a powerful way of demonstrating to students how their nonverbal behavior is perceived by their patients. Augmenting the environment by using a 3D representation of the interaction, spatial information about the student's communication can be augmented to the environment. IPSViz demonstrates this by augmenting the 3D environment and VH models with a gaze target. The gaze target is a texture that is projected wherever the user was looking during the interaction. The gaze target allows students to become aware of where their attention was actually focused, as opposed to where they thought it was focused.

IPSViz allows users to explore an H-VH interaction temporally through nonlinear review and scalable timelines. While in playback mode, the visualizations (video, 3D rendering, and timeline plots) are updated to present information relevant to the current playback time. The audio of the interaction is also played back so that students can hear themselves talk to the VH. Similar in principle to nonlinear video editors, students select moments from a timeline to instantaneously play them back. This allows students to review the interaction in any order. The timeline is represented visually in the interface by a slider 712. Additionally, events can be selected from a transcript 704 to review them. Scalable Timelines Interaction events and signals are depicted visually on timelines. This allows users to see the temporal relationships among events. The timelines are scalable. At the global time scale, users review the entire interaction at a glance. Local features are narrowed in on to review them in detail.

Figure 8:
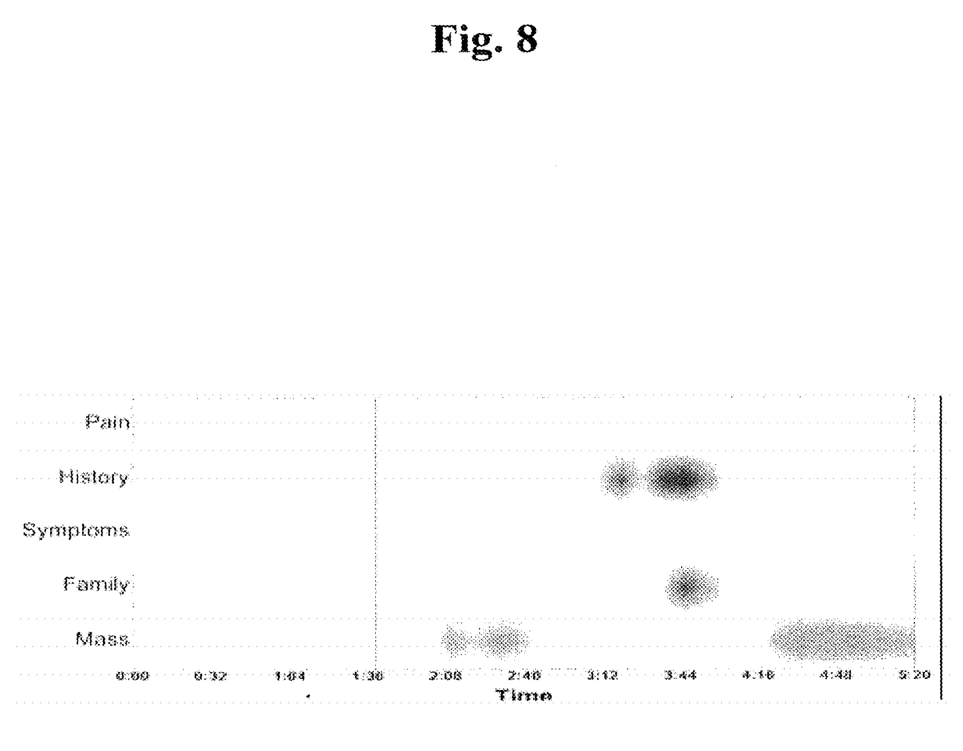
FIG. 8 depicts an exemplary embodiment of output charts resulting from the After Action Review process.

IPSViz highlights social aspects of the interaction by visualizing verbal and nonverbal communication. Verbal communication is presented explicitly in IPSViz by playing back the audio of the interaction. The topic plot, shown in more detail in FIG. 8, provides text and graphical representations of verbal communication. The transcript displays everything the VH and student said to each other. By reviewing the transcript, the student learns what information the VH gave him and what important information he did not get from the VH. The transcript also serves as a table of contents into the interaction in that it helps users find important events to review. The topic plot is an overview of the conversation. It filters the speech in the conversation down to a set of topics relevant to the scenario (e.g. symptoms, pain) and summarizes the use of these topics by plotting them on a timeline. Reviewing the topic plot allows students to see if they progressed from topic to topic logically, or if the flow of the conversation was confusing. They can also see if they forgot to discuss an important topic.

Nonverbal communication is represented in IPSViz through plots, the 3D-rendered motions of the VH, student, and gaze target, and through the video playback. Posture is used in interpersonal interaction to communicate friendliness, interest, and social status. The student can review their posture in IPSViz by watching himself on video, looking at the body lean of the 3D model or video that represents themselves, or by looking for peaks and valleys on the body lean plot. Paralanguage is the set of nonverbal vocal expressions (non-speech), such as tone of voice, volume and length of pauses. Students can review their paralanguage by hearing their voice when they play back the interaction. Appropriate gaze builds rapport by communicating attention, friendliness, and respect. The gaze target highlights where the student's head was pointing. Rendering from the VH's viewpoint allows the student to see how a patient interprets the student's head motion. Reviewing the interview from the VH's viewpoint shows students that patients notice gaze behavior and know when they are not paying attention.

IPSViz may be used to help students identity their own interrelationships with different groups of VPs based on age, sex, race, etc. By using the visualization screen of FIG. 7, and performing after-action review activities, the user can evaluate their own interactions with different types of VPs.

One benefit of virtual patients is realized by addressing conditions that cannot be easily reproduced using traditional educational approaches. Conditions of the neurological system that are principally manifested as a motion disorder are particularly suited for virtual simulation; for example, tremors of the hand, dyskinesias, and cranial nerve injuries. Such abnormal findings are difficult to reproduce using standardized patients, videos, web-based case studies, or lectures. Additionally, some of these physical abnormalities are predominantly visual in nature and do not require a complex interface or haptic representation for appropriate clinical examination. These particular findings can be displayed visually VPs provide two critical educational benefits, exposure and feedback. With regard to exposure, students experience abnormal findings. Medical educators could guarantee exposure to many conditions that simulators and standardized patient are unable to provide. The ad hoc nature of hospital rotations would be augmented to ensure all students would be exposed to a critical set of conditions. This would result in increased preparedness for actual patient care and reduced anxiety. With regard to feedback, each student's interaction with the VP will be evaluated. Upon completion of the VP interaction, a virtual instructor will enter the exam room. The virtual instructor will provide the student with feedback on their knowledge of abnormal findings and the associated conditions.

The difficulty in providing exposure to abnormal findings has also resulted in difficulty in providing adequate evaluation and feedback on student knowledge. Consider the goal of evaluating a student's ability to diagnose the underlying pathology in a patient with blurred vision. The process of identifying the cause involves developing a differential diagnosis from the patient's history. The differential diagnosis list is then serially revised given the physical examination findings. Finally, appropriate testing should be administered to arrive at a final diagnosis. The physical findings are critical to the process. In the setting of blurred vision, one possible underlying cause is cranial nerve injury. Clinical examination of that patient involves a student's ability to conduct an eye exam, including "follow my finger" and observing the range of motion of the eye and appearance of the eyelids.

VPs provide a platform for which educators could provide patients with specific abnormal conditions and evaluate student performance. After interacting with the VP, the students would be asked to generate a differential diagnosis and plan for treatment. In the Injured Cranial Nerve (ICN) example, the VP system would be able to evaluate if the student correctly conducted the eye exam, identified the appropriate nerve injury (could be one of three different ones given the physical findings) and requested the proper testing (e.g., MRI). The student would be provided feedback immediately.

After the student interacts with the VP, the system will provide an evaluation of, and feedback on, the interview.

The system will examine the questions asked by the medical student. Each of the conditions requires the student to obtain important 'core' pieces through proper questioning. The questions used by the student, and the completeness of the obtained patient history will be evaluated.

For each of the interactive exams, the system will identify the correctness of the motion of the user, as well as if the student correctly observed key visual cues. For the differential diagnosis, the system will compare the student's diagnosis to the actual condition. The completeness of the diagnosis, and the understanding and exploration of related conditions will contribute to the evaluation.

Upon completion of the approximately 10-minute interview, the system will immediately provide feedback to the student. A virtual instructor will enter the exam room. This virtual character will verbalize the evaluation of the student's interaction (given the evaluation approach discussed above). The virtual expert will critique the student's history taking, exam, and diagnosis skills. For example, he could remind students to "ask about the duration of the symptoms" or "check for alcohol consumption". If errors in the eye exam are detected, the virtual expert shows the proper method using animations and gestures. An example response would include "when you ask the patient to follow your finger, make sure you move your hand at least beyond the periphery of their eye range" (while gesturing to show the proper motion).

As a secondary component to the interaction, the VP will also be scripted and animated to express a high level of fear. Providing VPs with emotional and mental states provides an increased challenge to the medical student. Expressing empathy while conducting a complete exam will 1) test a student's knowledge of the subject matter and 2) evaluate the student's empathy towards the patient's condition. It is also closer to clinical practice.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A training system for providing a virtual human for training a user, the system comprising:
   an input device configured to receive input from the user;
   a simulation system receiving inputs from the input device, wherein the simulation system is configured to process a received input from the input device as communication from the user to the virtual human and generate an output representing a response of the virtual human reacting to an interaction as indicated by the communication from the user to the virtual human such that the output of the simulation system is based on the communication representing vocal interaction with a human represented by the virtual human; and
   a display in communication with the simulation system configured to receive the output and display to the user the response of the virtual human.

2. The training system of claim 1, further comprising:
   a component configured to provide evaluation and feedback by rendering on the display, based on the inputs and outputs of the simulation system, a representation of the user performing a task involving interaction with the virtual human.

3. The training system of claim 1, further comprising:
   a component configured to provide evaluation and feedback by rendering on the display, based on the inputs and outputs of the simulation system, a transcript screen depicting a text transcript of the interaction between the user and the virtual human.

4. The training system of claim 1, further comprising:
   a component configured to provide evaluation and feedback by rendering on the display, based on the inputs and outputs of the simulation system, a graph of a factor plotted versus time, the factor comprising a metric of the interaction between the user and the virtual human.

5. The training system of claim 4, wherein the factor plotted versus time is a frequency of occurrence of a topic in a discussion between the user and the virtual human.

6. The training system of claim 2, further comprising:
   a component configured to provide evaluation and feedback by mapping signals representing the user performing the task involving interaction with the human to a visual or other perceptual domain to produce visualizations rendered on the display.

7. The training system of claim 1, wherein the input device is a microphone configured to receive speech from the user.

8. The training system of claim 1, wherein the input device is configured to receive typed communication from the user.

9. A training system for providing a virtual human for training a user, the system comprising:
   an input device configured to receive input from the user;
   a simulation system configured to receive inputs from the input device, wherein the simulation system is configured to:
      track a conversation between the user and the virtual human by processing inputs from the input device as communication from the user to the virtual human and outputs generated by the simulation system representing responses of the virtual human reacting to the communication from the user;

identify a series of topics discussed by the user and the virtual human during the conversation based on tracking the conversation; and provide an assessment of the user's performance based on the series of topics discussed during the conversation.

10. The training system of claim 9, wherein the simulation system is further configured to generate a transcript of dialogue between the user and the virtual human based on tracking the conversation, and the training system further comprises a display configured to present the transcript to the user.

11. The training system of claim 9, wherein the training system further comprises a display configured to present the series of topics to the user.

12. The training system of claim 9, wherein the simulation system further comprises determining, from the series of topics, a frequency for at least one topic in the series of topics, and the training system further comprises a display to display the frequency for at least one topic in the series of topics to the user.

13. The training system of claim 9, wherein identifying the series of topics is further based on identifying the series of topics based on a type of interaction between the user and the virtual human during the conversation.

14. The training system of claim 9, wherein the training system further comprises at least one output device configured to present audio, video, text, and/or graphics indicating the assessment of the user's performance.

15. The training system of claim 14, wherein the at least one output device is further configured to present video displaying an interaction between the user and the virtual human during the conversation from the virtual human's perspective.

16. The training system of claim 9, wherein the training system further comprises:
  a plurality of sensors configured to obtain a set of input signals indicative of an interaction between the user and the virtual human; and
  a filters configured to process the set of input signals to compensate for sensor error, combine input signals to form new signals and/or extract new signals embedded in input signals.

17. The training system of claim 9, wherein the simulation system is further configured to evaluate the series of topics to determine a degree of completeness of interaction between the user and the virtual human, and providing the assessment of the user's performance is further based on the degree of completeness.

18. The training system of claim 9, wherein the simulation system is further configured to present a virtual instructor to the user, wherein the virtual instructor communicates an evaluation indicative of the assessment of user's performance to the user.

19. A computer-implemented method of programming a simulation system with a conversational model for implementing a virtual human that communicates with a user, wherein the conversational model comprises a set of queries and responses to be provided by the virtual human during a conversation, the method comprising:
  constructing an initial conversational model based on input from humans different than the virtual human;
  updating the conversational model by:
    receiving, over a computer network, information representing a plurality of queries posed by a plurality of first humans,
    for each query of at least a portion of the plurality of queries:
      selecting a plurality of possible responses to the query based on the conversational model, the selecting comprising, matching the query to queries in the conversational model based on full text searching and at least one additional criteria;
      routing the query and the selected possible responses to a user interface associated with at least one second human;
      receiving, from the user interface associated with the second human, at least one indication of the correctness of at least one selected possible response; and
      updating the conversational model based on the at least one indication of correctness.

20. The computer-implemented method of claim 19, wherein updating the conversational model further comprises assigning at least one response to a query based on the at least one indication of correctness.

21. The computer-implemented method of claim 19, wherein updating the conversational model further comprises receiving, from the user interface associated with the second human, at least one new possible response to a query of the at least a portion of the plurality of queries, and updating the conversational model to include the at least one new possible response for the query.

22. The computer-implemented method of claim 19, wherein updating the conversational model further comprises removing a selected possible response from the conversational model based on the at least one indication of correctness.

23. A training system for providing a virtual human that communicates with a user, the system comprising: an input device configured to receive input from the user;
  at least one hardware processor; and
  at least one non-transitory computer-readable storage medium storing:
  a conversational model relating queries posed by the user to responses provided by the virtual human in response to the individual queries; and
  processor-executable instructions that, when executed by the at least one hardware processor, cause the at least one hardware processor to perform:
    receive, from the input device, an input provided by the user as communication with the virtual human;
    analyze the communication to identify a query stored in the conversational model as being a match for the communication and a set responses stored in the conversational model in association with the identified query;
    select a response from the set of responses as being a relevant response by the virtual human to the query poised by the user; and
    output the selected response to the user as an interaction by a human represented by the virtual human as responding to the user's query.

24. The training system of claim 23, wherein analyzing the communication further comprises identifying the at least one keyword in the input provided by the user and identifying the query based on the at least one keyword as being included in the query.

25. The training system of claim 24, wherein identifying the query based on the at least one keyword further comprises assigning a degree of relevance to each of plurality of queries based on the number of keywords found in each of the plurality of queries that match the at least one keyword identified in the input and identifying the query from among the plurality of queries as having the highest degree of relevance.

26. The training system of claim 24, further comprising processor-executable instructions that, when executed by the at least one hardware processor:
   track identified queries and selected responses as an interaction between the user and the virtual human; and
   render on a display a virtual instructor character verbalizing an evaluation of the interaction between the user and the virtual human.

27. The training system of claim 26, wherein:
   the evaluation is computed based on one or more of:
      topics omitted in the interaction; or
      the order of topics covered in the interaction.

* * * * *